(12) United States Patent
Maeda

(10) Patent No.: US 9,074,658 B2
(45) Date of Patent: Jul. 7, 2015

(54) CHAIN TENSIONER LEVER

(71) Applicant: Fuji Jukogyo Kabushiki Kaisha, Tokyo (JP)

(72) Inventor: Osamu Maeda, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/028,359

(22) Filed: Sep. 16, 2013

(65) Prior Publication Data

US 2014/0087903 A1    Mar. 27, 2014

(30) Foreign Application Priority Data

Sep. 26, 2012 (JP) ................. 2012-212913

(51) Int. Cl.
  *F16H 7/08* (2006.01)
  *F16H 7/18* (2006.01)

(52) U.S. Cl.
  CPC ............ *F16H 7/08* (2013.01); *F16H 2007/185* (2013.01); *F16H 7/18* (2013.01)

(58) Field of Classification Search
  CPC ..... F16H 2007/0872; F16H 7/08; F16H 7/18; F16H 2007/0804; F16H 2007/0806
  USPC ........................................................ 474/111
  See application file for complete search history.

(56) References Cited

U.S. PATENT DOCUMENTS

| | | | | |
|---|---|---|---|---|
| 3,455,178 | A * | 7/1969 | Ruoff et al. ................... | 474/110 |
| 3,830,114 | A * | 8/1974 | Daines ........................... | 474/111 |
| 6,110,063 | A * | 8/2000 | Okabe et al. ................... | 474/111 |
| 6,213,073 | B1 * | 4/2001 | Iwata ............................ | 123/90.38 |
| 6,312,353 | B1 * | 11/2001 | Oba ............................... | 474/140 |
| 6,332,441 | B1 * | 12/2001 | Sugiyama et al. ............ | 123/90.31 |
| 7,632,200 | B2 * | 12/2009 | Markley et al. .............. | 474/111 |
| 7,901,309 | B2 * | 3/2011 | Lehtovaara et al. .......... | 474/111 |
| 7,942,769 | B2 * | 5/2011 | Pflug et al. ................... | 474/91 |
| 2002/0039941 | A1 * | 4/2002 | Nakamura et al. ............ | 474/111 |
| 2002/0160868 | A1 * | 10/2002 | Wigsten et al. ............... | 474/101 |
| 2003/0125144 | A1 * | 7/2003 | Horikawa et al. ............. | 474/111 |
| 2003/0134704 | A1 * | 7/2003 | Konno et al. .................. | 474/111 |
| 2004/0132570 | A1 * | 7/2004 | Takeda .......................... | 474/111 |
| 2005/0079938 | A1 * | 4/2005 | Hashimoto et al. ........... | 474/111 |
| 2006/0025256 | A1 * | 2/2006 | Wake ............................. | 474/111 |
| 2006/0100048 | A1 * | 5/2006 | Wake et al. ................... | 474/111 |
| 2006/0240923 | A1 * | 10/2006 | Yokoyama .................... | 474/111 |
| 2006/0276285 | A1 * | 12/2006 | Markley et al. .............. | 474/111 |
| 2006/0293134 | A1 * | 12/2006 | Markley et al. .............. | 474/111 |
| 2007/0259744 | A1 * | 11/2007 | Lehtovaara et al. .......... | 474/111 |
| 2009/0017949 | A1 * | 1/2009 | Sato et al. ..................... | 474/111 |

(Continued)

FOREIGN PATENT DOCUMENTS

| | | |
|---|---|---|
| JP | 7-35207 A | 2/1995 |
| JP | 2007-64369 A | 3/2007 |
| JP | 2009-210015 A | 9/2009 |

OTHER PUBLICATIONS

Notification of Reason(s) for Refusal dated Oct. 29, 2013.

*Primary Examiner* — Henry Liu
(74) *Attorney, Agent, or Firm* — McGinn IP Law Group, PLLC

(57) ABSTRACT

A chain tensioner lever has a chain guide surface which is formed such that in its main area extending from an end near a boss to an end near a piston contact, a curved track that slides along a timing chain in the chain travel direction has a continuously varying radius of curvature.

1 Claim, 3 Drawing Sheets

(56) References Cited

U.S. PATENT DOCUMENTS

| | | | |
|---|---|---|---|
| 2009/0036242 A1* | 2/2009 | Hayami et al. | 474/111 |
| 2009/0036243 A1* | 2/2009 | Smart | 474/111 |
| 2009/0098965 A1* | 4/2009 | Schuseil et al. | 474/111 |
| 2010/0022339 A1* | 1/2010 | Barve | 474/111 |
| 2010/0145591 A1* | 6/2010 | Rolando | 701/102 |
| 2011/0306449 A1* | 12/2011 | Adams | 474/111 |
| 2012/0135832 A1* | 5/2012 | Muguruma et al. | 474/111 |
| 2012/0225744 A1* | 9/2012 | Markley | 474/111 |

* cited by examiner

CHAIN TENSIONER LEVER

CROSS-REFERENCE TO RELATED APPLICATIONS

The present application claims priority from Japanese Patent Application No. 2012-212913, filed on Sep. 26, 2012, the entire contents of which are hereby incorporated by reference.

BACKGROUND

1. Technical Field

The present invention relates to chain tensioner levers that contact a chain wound around multiple sprockets in order to apply tension thereto.

2. Related Art

In a typical power transmission apparatus that transmits power via a chain, a tensioner lever is used to apply appropriate tension to a chain in cooperation with a hydraulic tensioner or the like while contacting the chain. However, if a track of the chain is not set appropriately by the tensioner lever, the chain repeatedly undergoes forced displacement variation, and as a result, the chain flaps, thereby leading to a reduction in durability and an increase in vibration noise.

To solve this problem, Japanese Unexamined Patent Application Publication (JP-A) No. H7-35207 discloses a technique for preventing forced displacement variation in the vicinity of a boundary between a curved track having a radius of curvature R and a linear track, which together constitute a track of a chain contact surface of a chain guide (a tensioner lever), by forming the linear track, which is adjacent to the curved track, on a straight line obtained by moving a tangent line at an end point of the curved track in parallel by at least a predetermined distance in a direction heading away from a center of curvature of the curved track.

As disclosed in JP-A No. H7-35207, a curved track of a tensioner lever that contacts a chain is often formed with an arc. Therefore, when an increase in a length of a chain contact region is required, the curved track is formed by connecting multiple arcs using tangent lines. In so doing, an inertial force generated by forced displacement variation of the chain varies discontinuously, and as a result, the chain may flatter, thereby leading to an increase in vibration noise.

SUMMARY OF THE INVENTION

The present invention has been designed in consideration of these circumstances, and an object thereof is to provide a chain tensioner lever with which an inertial force generated by forced displacement variation of a chain can be caused to vary smoothly so that flapping vibration of the chain can be suppressed.

An aspect of the present invention provides a chain tensioner lever that contacts a chain wound around multiple sprockets in order to apply tension thereto. A chain guide surface formed in a lengthwise direction of the chain tensioner lever so as to slide along the chain is formed from a curve having a continuously varying radius of curvature.

DETAILED DESCRIPTION

An example of the present invention will be described below with reference to the drawings.

Figure 1:
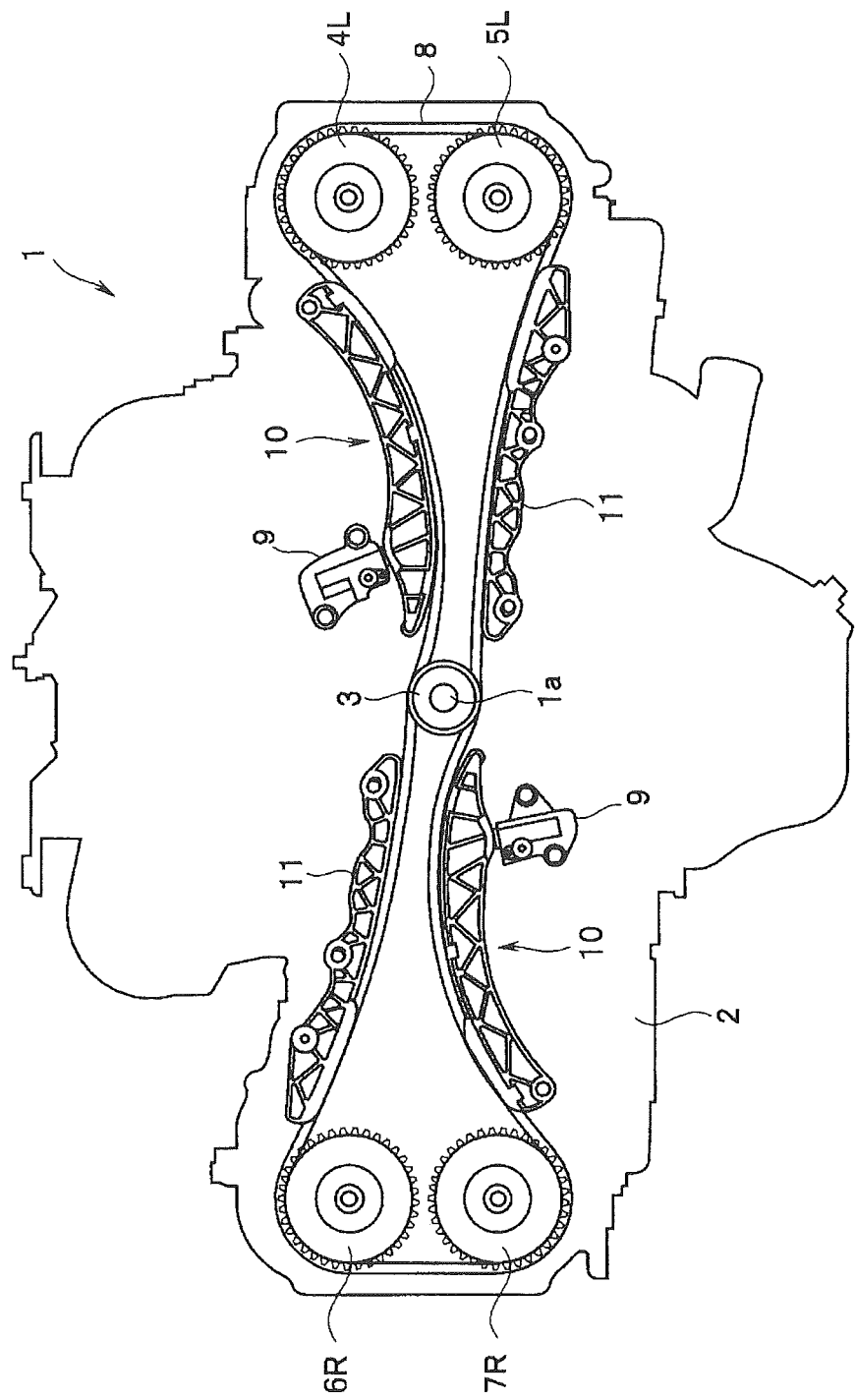
FIG. 1 is a front view illustrating a timing chain of an engine.

FIG. 1 illustrates a timing chain of an engine 1 to which the example of the present invention is applied. In this example, the engine 1 is a horizontally opposed engine separated into two cylinder blocks 2 on left and right banks (a right side and a left side of FIG. 1 correspond respectively to the left bank and the right bank) centering on a crankshaft 1a.

A crank sprocket 3 is attached to the crankshaft 1a of the engine 1, and a timing chain 8 is wound around the crank sprocket 3, cam sprockets 4L and 5L attached respectively to an intake camshaft and an exhaust camshaft of the left bank, and cam sprockets 6R and 7R attached respectively to an intake camshaft and an exhaust camshaft of the right bank. Rotation of the crankshaft 1a (a drive shaft) is transmitted to the left and right camshafts (driven shafts) by the timing chain 8.

Further, chain tensioner levers 10 that are configured to be pressed into contact with the timing chain 8 by hydraulic tensioners 9 are interposed on both left and right sides of the crank sprocket 3. The chain tensioner levers 10 apply tension to the timing chain 8, guide a track of the timing chain 8, and prevent flapping vibration of the timing chain 8. One end side of each chain tensioner lever 10 is pivotally supported by the corresponding cylinder block 2 to be free to swing.

In this example, the chain tensioner lever 10 is disposed in two locations, namely between the intake side cam sprocket 4L of the left bank and the crank sprocket 3 and between the exhaust side cam sprocket 7R of the right bank and the crank sprocket 3. Fixed guides 11 contacting the timing chain 8 along predetermined chain tracks are disposed respectively between the exhaust side cam sprocket 5L of the left bank and the crank sprocket 3 and between the intake side cam sprocket 6R of the right bank and the crank sprocket 3.

Figure 2:
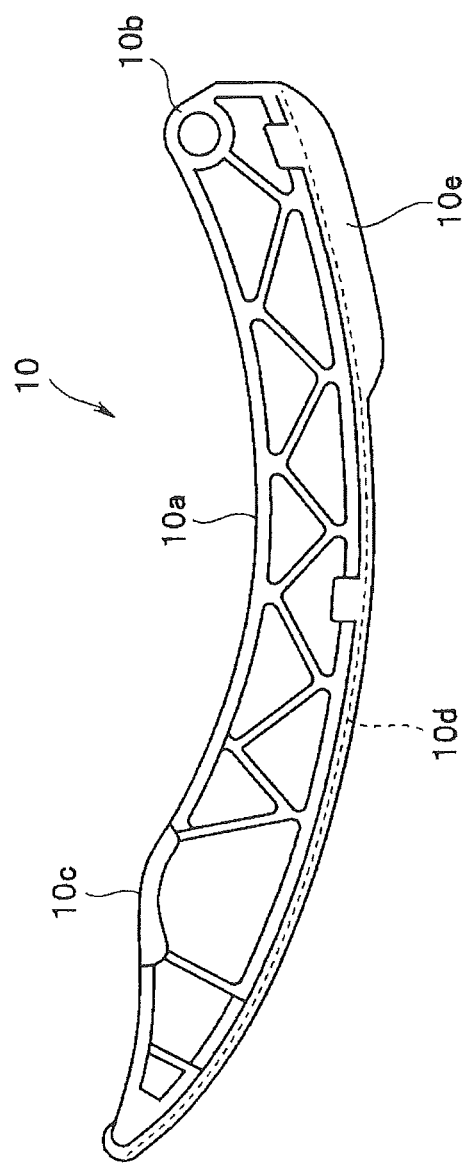
FIG. 2 is a plan view of a chain tensioner lever.

More specifically, as illustrated in FIG. 2, the chain tensioner lever 10 has a plate-form lever main body 10a having an elongated curve shape. On one end of the lever main body 10a in the lengthwise direction, a boss 10b is provided to insert a bolt or the like for pivotally supporting the chain tensioner lever 10 on the cylinder block 2. On the other end of the lever main body 10a removed from the boss portion 10b, a piston contact 10c is provided that is to be contacted by a piston of the hydraulic tensioner 9.

Further, a chain guide surface 10d that slides along the timing chain 8 in the lever lengthwise direction is formed on an outer side of the curved shape of the lever main body 10a. A side wall 10e that clamps the timing chain 8 in the width direction so as to prevent the timing chain 8 from becoming dislodged stands upright on both sides of the chain guide surface 10d in the vicinity of the boss 10b.

The two chain tensioner levers 10 disposed on the left and right of the crank sprocket 3 are respectively disposed in positions rotated by substantially 180° relative to each other about a crank axis such that the hydraulic tensioners 9 (the piston contact portions 10c) are positioned on the crank sprocket 3 side.

Here, the chain contact surface 10d is formed such that in a main area thereof extending from an end near the boss 10b to an end near the piston contact 10c, a curved track that slides along the timing chain 8 in the chain travel direction has a continuously varying radius of curvature, such as an involute curve and a clothoid curve.

For instance, when an involute curve described by an involute of a circle is employed as the curve forming the curved track of the chain guide surface 10d, the chain guide surface 10d is formed such that a distance between a point on the curve and a point of contact with a base circle (a length of a tangent line; the radius of curvature) increases continuously from the crank sprocket 3 toward the cam sprockets 4L and 7R (from an opposite end to the piston contact portion 10c toward an opposite end to the boss portion 10b).

By forming the chain guide surface 10d from this involute curve, an inertial force of the chain can be prevented from varying discontinuously when the timing chain 8 travels along the curved surface, and as a result, an exciting force that causes the chain to flap can be reduced in comparison with a conventional chain tensioner lever in which the chain guide surface is formed by connecting multiple arcs.

Figure 3:
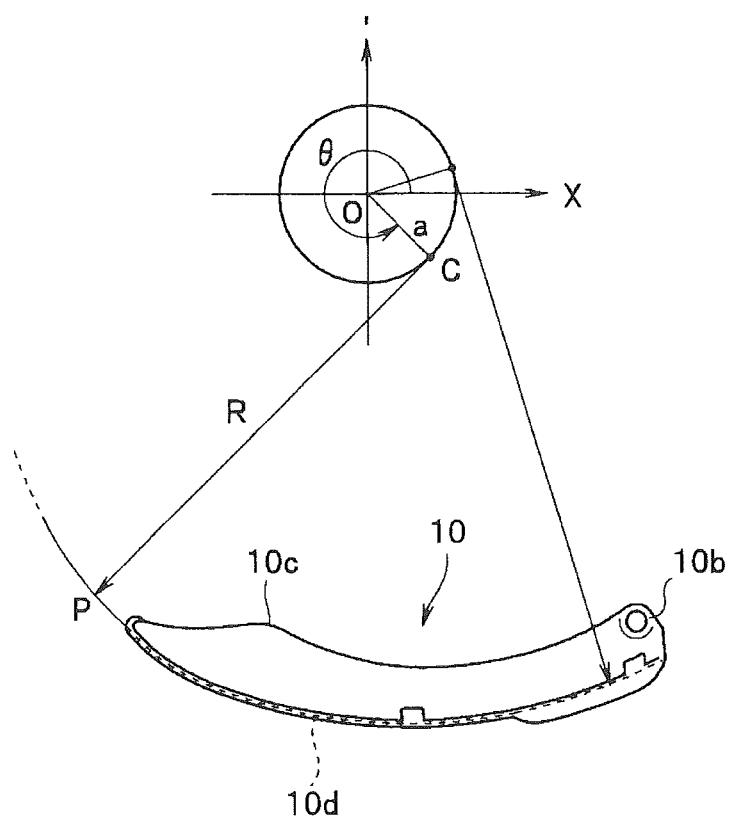
FIG. 3 is an illustrative view illustrating a curved track of a chain guide surface.

More specifically, as illustrated in FIG. 3, when a circle having a radius a centering on an origin O of an XY plane is set as the base circle of the involute curve, a point P (x, y) on the involute curve having a point (a, 0) as a starting point can be expressed by following expressions using a central angle θ.

$$x = a(\cos θ + θ \times \sin θ)$$

$$y = a(\sin θ - θ \times \cos θ)$$

A distance (the radius of curvature) R between an intersection C (a×cos θ, a×sin θ) of a tangent line drawn from the point P (x, y) on the curve to the base circle and the point P (x, y) can be described by a length a of an arc having the central angle θ of the base circle×θ, and the inertial force generated by forced displacement variation of the chain can be determined on the basis of temporal variation in displacement defined by the distance R, or in other words temporal variation in the central angle θ. Hence, by forming the chain guide surface 10d from the involute curve having the radius of curvature R that varies continuously in accordance with the central angle θ, discontinuous variation in the inertial force caused by the forced displacement variation of the chain can be reduced.

Accordingly, a vibration exciting force input into the timing chain 8 and the chain tensioner lever 10 can be reduced, and as a result, flapping vibration of the chain can be suppressed. Discontinuous variation in the inertial force can be reduced likewise when the chain guide surface 10d is formed from a clothoid curve, enabling a reduction in the vibratory force that causes the chain to flap.

Hence, in this example, discontinuous variation in the inertial force of the chain is prevented by forming the chain guide surface 10d of the chain tensioner lever 10 from a curve having a continuously varying radius of curvature. As a result, the vibratory force that causes the chain to flap can be reduced.

When the present invention is applied to a timing chain of an engine in particular, the vibration exciting force transmitted from the chain tensioner lever to the cylinder block can be reduced, enabling a reduction in engine noise emitted into a vehicle cabin and an improvement in fuel efficiency resulting from a reduction in friction. Moreover, the present invention can be applied to an existing chain tensioner lever simply by modifying the shape design of the chain guide surface, and in so doing, cost increases can be minimized without impairing productivity.

The invention claimed is:

1. A chain tensioner lever that contacts a timing chain wound around a crank sprocket and a cam sprocket of an engine in order to apply tension thereto,
    wherein a chain guide surface formed in the lengthwise direction of the chain tensioner lever so as to slide along the timing chain is formed from a curve having a radius of curvature that continuously becomes larger from the crank sprocket towards the cam sprocket.

* * * * *